(12) United States Patent
Carrano Castro

(10) Patent No.: US 6,474,411 B1
(45) Date of Patent: Nov. 5, 2002

(54) METAL PROTECTOR FOR THREADED EXTREMITIES OF WELL DRILLING TUBES

(76) Inventor: Angel Gabriel Amadeo Carrano Castro, Framboyanes Lote 1, Manzana 4, Ciudad Industrial "Bruno Pagliai", C.P. 91647, Tejeria Veracruz (MX)

( * ) Notice: Subject to any disclaimer, the term of this patent is extended or adjusted under 35 U.S.C. 154(b) by 0 days.

(21) Appl. No.: 09/857,664

(22) PCT Filed: Nov. 4, 1999

(86) PCT No.: PCT/MX99/00032

§ 371 (c)(1),
(2), (4) Date: Sep. 25, 2001

(87) PCT Pub. No.: WO00/36322

PCT Pub. Date: Jun. 22, 2000

(51) Int. Cl.$^7$ .............................................. E21B 17/12
(52) U.S. Cl. .................. 166/77.51; 166/85.1; 166/79.1; 166/92.1; 166/241.7; 166/242.1
(58) Field of Search .............................. 166/75.11, 77.1, 166/77.51, 85.1, 85.3, 85.5, 79.1, 92.1, 241.7, 242.1

(56) References Cited

U.S. PATENT DOCUMENTS

| | | | |
|---|---|---|---|
| 1,860,886 A | * | 5/1932 | Brownstein |
| 2,627,877 A | * | 2/1953 | Phillips |
| 4,139,023 A | * | 2/1979 | Turley |
| 4,157,100 A | * | 6/1979 | Turk |
| 4,337,799 A | * | 7/1982 | Hoover |
| 4,379,471 A | * | 4/1983 | Kuenzel |
| 5,148,835 A | * | 9/1992 | Clark |
| 5,303,743 A | * | 4/1994 | Vincent |
| 5,866,218 A | * | 2/1999 | Meuth |

FOREIGN PATENT DOCUMENTS

| | | | |
|---|---|---|---|
| DE | 3321273 | * | 12/1984 |
| EP | 0128575 | * | 6/1984 |
| GB | 855175 | * | 11/1960 |

* cited by examiner

Primary Examiner—Roger Schoeppel
(74) Attorney, Agent, or Firm—Ladas & Parry

(57) ABSTRACT

The invention relates to metal protectors for threaded extremities of pipe joints for the drilling of oil, gas and geothermal wells. The protectors are intended to protect the threads and seals of the assembly joint against shocks during transportation and handling in the wells and also eliminate the need to use a cardboard washer, which is only used to deliver the product, exposing the seal to shocks during handling in the wells after deterioration of the cardboard washer, considering that cardboard does not provide the same protection against impacts and shocks as steel.

9 Claims, 7 Drawing Sheets

AMENDED SHEET

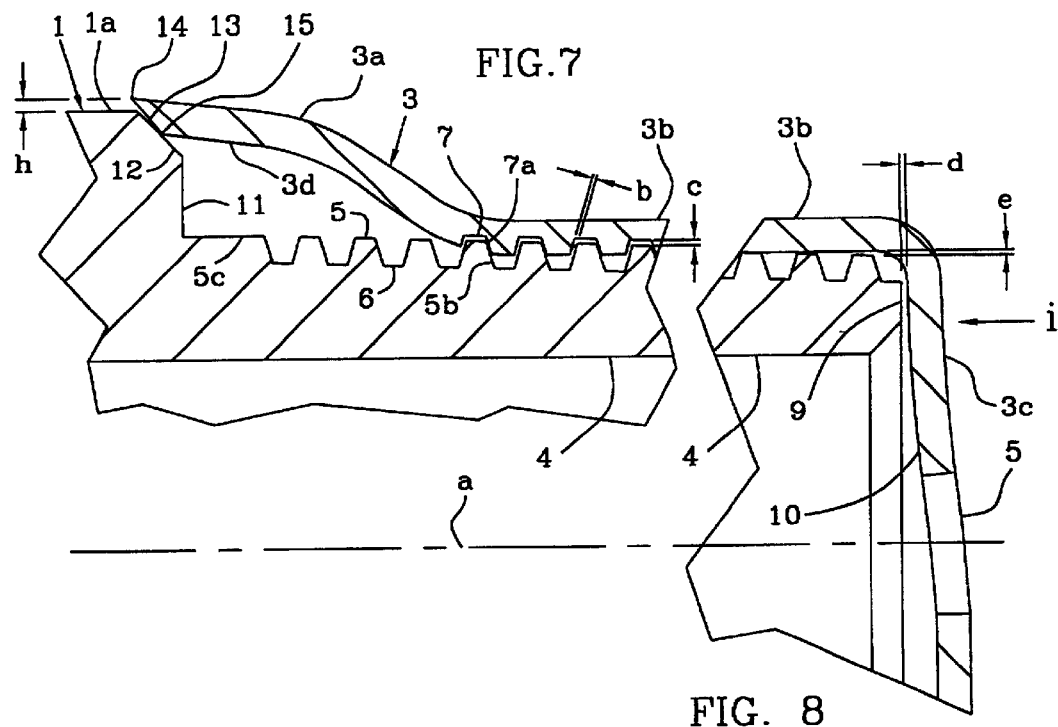
FIG. 7
FIG. 8
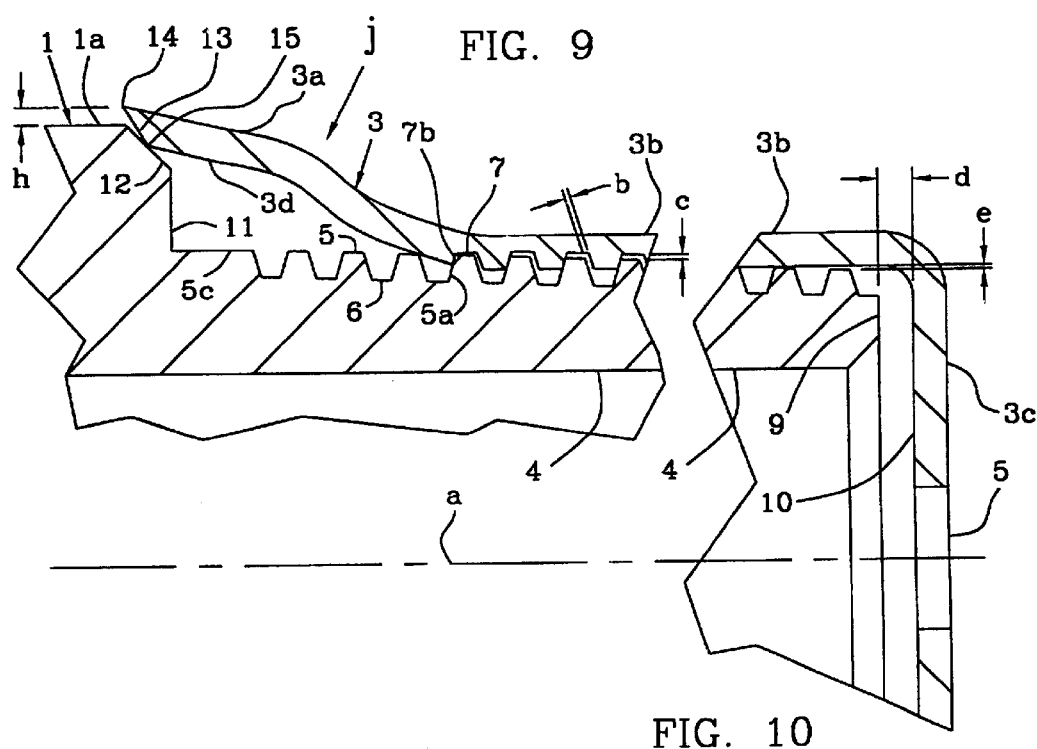
FIG. 9
FIG. 10
AMENDED SHEET

AMENDED SHEET

AMENDED SHEET

METAL PROTECTOR FOR THREADED EXTREMITIES OF WELL DRILLING TUBES

FIELD OF THE INVENTION

The present invention relates to a metallic protector for the hydraulic seal surfaces located at the threaded ends of drill pipes, used for drilling of oil, gas and geothermal wells, which protect the critical hydraulic seal surfaces on the drill pipe's side pinion and side box joints, collectively referred to as drill pipe's female and male adapters. This protection of the seal surfaces against accidental external impacts using the metallic protectors, is provided during the final stages of drill pipe fabrication which includes sandblasting, painting and application of epoxy coating on the inside surface of the drill pipe assembly, and during transportation, handling and maneuvering in the wells.

DESCRIPTION OF BACKGROUND AND PRIOR ART

References:
D1: GB865 175A
D2: U.S. Pat. No. 2,627,877A
D3: Partial reference information. API (American Petroleum Institute)

Wells for oil, gas and extracted geothermal heat in form of steam or liquid having elevated temperatures, are typically drilled using a drill attached to a drill pipe or drill pipe strings which consist of a number of drill pipes attached together by use of threaded joints. These joints include two seal surfaces, one on each of the joining ends of the drill pipes. These seal surfaces are located perpendicular relative to the center line of each pipe assembly and at the entrance to the threaded end of the female pipe adapter, and below the threaded end of the male pipe adapter. When two drill pipe sections are screwed together, the two seal surfaces meet and join, and when the two pipe sections are properly torqued, the two seal surface a form a joint which is typically labeled a metal to metal seal joint. This joint is herein referred to as the drill pipe hydraulic joint.

This hydraulic joint is an extremely critical interface between the drill pipe section as the drill pipe is the rotational connection between the drill bit and the wellhead motor, and also serves as a conduit to transfer a variety of chemical slurries, also called mud, to the drill bit for the purpose of lubricating, flushing drill residue back out of the drilled well, and for cooling the drill bit and the attached drill pipe string which is exposed to elevated temperatures from friction induced heat. Drilled wells can reach a depth of 6 kilometers or 3.7 miles, and the slurry pumped through the drill pipe string must reach the point of the drill bit for the above stated purposes. The pressure of the pumped slurry and thus the internal pressure of the drill pipe string, can be up to 3,000 PSI or 210 Kg/cm$^2$. Unit pipes come in a variety of different diameters from a few inches and up to 18 inches, or 46 centimeters, and with a length of up to 60 feet, or 20 meters. Drill pipe assemblies are typically fabricated from alloy steel SAE 4137H, equivalent UNS number G41370, and have a Rockwell hardness of 30~32 HRC. The hydraulic joint between each drill pipe section must be capable of withstanding extreme pressure and high torsional loading without leaking. Any leaks across two mating seal surfaces caused by an abnormal surface condition can very rapidly destroy the threaded connection and seal surfaces by erosion caused by high velocity of the leaking and escaping fluid, and consequently, the volume of fluid reaching the drill bit is reduced and this can have adverse consequences, and the drilling fluid may eventually break the drill pipe of the point of leakage, it can be a very expensive operation to recover the drill pipe lengths already in the ground, in both terms of time and money.

A drill pipe section is normally a three piece assembly, consisting of a pipe section where the side pinion, or main adapter, is welded to one end of the pipe, and the side box, or female adapter, is welded in the other end. To preclude hydraulic seal failure of the drill piping during operation, the drill pipe fabrication is concluded with a hydraulic testing, where the drill pipe assembly is internally pressurized to a pressure of between 5,000 to 10,000 PSI or 351 to 703 Kg/cm2. Furthermore, to preserve and protect critical areas on the drill pipe assembly, caps or other devices are normally attached to the ends of the assembly to provide protection during the final treatment of sandblasting and painting, and application of epoxy coating of the inside surfaces of the assembly, and during transportation, handling and maneuvering in the well.

At the present, there exist in the market a number of thread and seal protectors having different shape, form and functions. A common type of protector comprise a bell shaped form and with internal threads for adaptation to the drill pipe's male adapter, and having a flat compressed cardboard washer installed as an interface between the lower edge of the projector bell and the hydraulic seal surface on the drill pipe adapter. A protector plug comprising a collar being formed perpendicular to the center line of the protector and flared outward, and with external threads on the plug body for adaptation to the drill pipe's female adapter, and having a flat compressed cardboard washer installed as an interface between the lower surface of the protector collar, and the hydraulic seal surface on the drill pipe adapter. It is generally recognized that the concept or using compressed cardboard washers as a seal surface protector, provides partial protection, only. Furthermore, these washers deteriorate under extreme weather conditions, and are considered for one time use, only.

Reference 1, patent number GB855 175A, provides a concept for a single use die-cast screw thread protector for the screwed or pin ends of oil well sucker rods, with the main objective of sealing and protecting the pin or threaded ends of the sucker rod during painting and oven drying and handling and to prevent the entry of moisture into the critical threaded area. Sucker rods are used as the interfacing connection between the reciprocating driver motor, and the pump piston in the well. Sucker rods are typically connected together using an internally threaded coupling screwed to the sucker rod's external threaded pin ends. Sucker rod or sucker rod strings, with multiple sucker rods connected together, are operated in vertical reciprocating movement and are under pull and tensional levels of loading, which vary from moderate to extremely high, dependent on the depth of the well. Sucker rods or strings are exposed to external pressure from the pumped liquid, and there are no hydraulic leak paths within the adjoining sucker rod ends and interfacing coupling. There is a high failure rate in the industry of sucker rods in operation. The majority of the incidents are associated with threaded pin ends failure caused by metal fatigue from high pull and tensional loading, and induced operating vibrations. On the contrary, a drill pipe or drill pipe string operates at moderate to extremely high torsional loading and internal hydraulic pressure, relative to the depth of the well. The most common cause of drill pipe failure is associated with high friction loading between the drill pipe or drill pipe string and the well wall which can cause a reduction of the pipe diameter of up to 0.275 inch or 7.0 millimeter, leaks at the hydraulic joint between pipe adapter sections with consequent failure of the joint from high liquid velocity erosion, and last, stress induced metal fatigue from violent shock, torsional loading and vibrations during the drilling operation.

To alleviate some of the causes for a drill pipe and sucker rod strings failure in the well, it is imperative that precautions be employed, which includes care during the last phases of drill and sucker rods fabrication, handling and transportation to the well site. Last minute inspections of critical areas are carried out prior to the insertion of a sucker rod or drill pipe into the well. Such inspections and evaluations are commonly prone to human errors, causing unexpected situations at a well site. Precautionary measures include the use of various type of screw-on protector caps or clamp-on devices, all with the common goal of providing adequate protection of essential threads and seal areas, and to deliver the pipes and rods to the well site in an acceptable condition. The screw-on protector caps commonly remain in place on a sucker rod or drill pipe until the component is up-ended into a vertical position over the well, and the protector cap is then removed and the rod or pipe is now ready to be connected to a rod coupling or a drill pipe section located in the well. The removed protectors or protector components like washers, are commonly for single use only, and are discarded at the well site. Sucker rods and drill pipes are commonly reusable and may be transferred to another site for re-use. When a sucker rod or drill pipe is disconnected, seal and thread protection is added to the ends of such components, which may be similar in nature to what was used when the component originally arrived to the well site.

The thread protector cap described in reference D1, is for single-use only, as stated in page section 20. Per FIG. 3 and claim 1, the protector cap is for use on a screwed end of a steel rod with the objective of protecting the rod's end threads. This described thread protector cap design includes a number of unique features which are all interrelated, which may be construed to imply that if one of the features is eliminated or significantly changed, the intended function of a protector cap which will remain securely attached to the threaded end member of rod during extreme thermal cyclic changes, may be diminished, or canceled all together.

In reference D1 FIG. 4, protector cap rim 17 extend radially outward from rod surface c. Although not specifically stated in the description and the claims, it is assumed that the inner circumferential surface of rim 17 has an intended function of centering the protector cap relative to rod surface diameter c, to establish the desired line contact relationship between edge i, which is the interface between shoulder surface b and the angular surface g, and the cap seal surface 18, and also to limit the amount of radial shift of the inside surface of rim 17 relative to surface c in this event of accidental impact on surfaces 12, 15, 16 and 17. In the fabrication shop, warehouses and in the well drilling or pumping fields, sucker rods and drill pipes are typically stored in racks in both single and multiple layers. Rack support points are typically two points supports on diameter d for sucker rods, and on the pipe diameter adjacent to the male and female adapters for drill pipe assemblies. In the event of multiple layer stacking for the sucker rods having the FIG. 1 protector cap installed at both ends of the rods, the bearing and contact point between individual rods and layer would be rim surface 17, as it represents the major diameter on the sucker rod assembly, which may have adverse effect on the sealing function features. Die-cast alloys such as zinc are known to have relatively soft surface condition and acceptable structural rigidity but being fragile, having moderate to low yield strength. In the extreme event of high stack loading on lower layers protector cap's rim 17, the rim could collapse and break. In a second postulated scenario, where the flared and concaved protector cap surface 16 is exposed to an impact by a member having sharp edges coming from a direction going towards rim 17 and slightly off parallelism with rod center line f, where due to the form of surface 16 with the outward overhang inward rim 17, and the soft surface condition of the cap's die-cast material, the sharp impact edge may not be repelled by surface 16 and instead bury itself into the soft die-cast cap material thus transferring the impact load to rod edge i and cap surface 18. Depending on the level of impact loading, the die-cast material may yield and break and move toward and reach the rod shoulder surface b, which could be adversely affected. Alternately, should this surface be the hydraulic seal surface on a drill pipe's male adapter which is similar in configuration, an impact of this nature would likely render the seal surface unacceptable for use. Modifying the cap design as shown in FIG. 4, like eliminating rim 17 and have surfaces 16 and 18 extend to surface c only, and increase the radius of surface 16 to minimize the potential for the above described presumed accidental events and consequent potential damage to the protected components and surfaces, would likely compromise the intended function of the unique features such as a unique thread pitch configuration which together with the dimensional differential of the coefficient of thermal expansion of the threaded steel pin and of the die cast zinc cap having a guide rim 17, provides the sealing effect between surfaces 18 and i, and prevent the cap from unscrewing.

Pipe thread protector plug 47 in FIG. 6 of reference D2, is for internal threaded pipe ends having internal features which differ from the basic configuration of the drill pipe female adapter described in this document. The main features of reference D2's FIG. 6 protector plug include a collar 38 rolled outward and inward 38a, 38b and 38c, terminating in lip 48 being approximately parallel with plug taper surface 39. Lip 48 when the plug is screwed and tighten into the female end of a pipe, interfaces and wedges to form a seal with inside tapered surface 34, whose major diameter is substantially larger than the major diameter of internal threads 32. Collar 38 is located in front of pipe surface 40 and provides impact protection of same to a level limited to the structural strength of collar 38. Protector plugs including collar 38 are typically fabricated for cost and economical reasons, from carbon steel sheet of gage 16 (equivalent thickness 0.060 inch to 1.50 millimeter). In the event that the collar should collapse locally from excessive impact force, the gap between surfaces 40 and 38c would be reduced to zero, and remaining kinetic energy in an impacting object would be transferred into surface 40 through 38a and 38c, and likely cause an unacceptable surface condition of surface 40. A radial gap is evident between surfaces 40 and 38c, which may preclude the retention of anticorrosion compound applied to surface 40. This crevice is also a trap for foreign matters and moisture, which if present, may create unacceptable conditions for surface 40. If the plug was to be screwed further in to close the subject radial and circumferential cap, surface 38c would eventually become in contact with surface 40 and may cause galling between the two surfaces from metal to metal friction, and possible entrapment of foreign matters. The above described observations are not construed to be negative to, what is believed, the intended use of thread protector plugs for standard and commercially available pipes and conduit pipes, but include the perspective of using the protector plug for drill pipe female adapter's frontal hydraulic seal surface. The described conditions, and uses, and scenarios would be unacceptable for the drill pipe adapter's hydraulic seal surface, which is typically machined to a surface finish of 63 RMS or better, which is the only acceptable surface condition prior to use in a drill well.

The present invention relates to a projector cap for protecting the critical frontal hydraulic seal surface of the side pinion, or drill pipe upset, on a drill pipe assembly, also referred to herein as the drill pipe male adapter. The protector cap is a screw-on type having internal threads in form and pitch equal in the external threads on the threaded end of the drill pipe adapter. Threaded ends of drill pipes are commonly threads in accordance with the specifications of API (American Petroleum Institute), or may be of a type typically referred to as premium threads which are special threads developed by the industry, which are often patented proprietary threads. Threads in the above stated categories are either straight or taper types. The cap is bell shaped in form with an upper straight or tapered cylindrical section which includes the internal threads, and terminating in a closed end having a center penetration being a non-circular shape for insertion of a torque tool having an equal shape. The lower bell shaped section can be viewed as a circumferential skirt whose outside diameter extents to, but not beyond, the outside diameter of the drill pipe adapter. The lower inner edge of the cap bell is machined to a bevel whose surface is parallel to a beveled circumferential surface located between the outer diameter and the frontal hydraulic seal surface on the drill pipe adapter. The internal threads in the protector cap are intentionally machined to a loose fit relationship with the external threads on the male adapter for the purpose of preventing thread galling, and also to provide axial thread to thread clearances between the threaded member on the adapter and the cap. The material of the protector cap is typically, but not limited to, SAE 1006GH, equivalent UNS number G10060, having a Rockwell hardness of 40–45 HRB. The minimum sheet metal thickness is typically gage number 12 or 0.105 inch, per manufacturers standard gages for steel. The sheet metal is typically stamped to circular blanks in a gap frame press followed by a single or multiple shell drawn process in a gap frame or hydraulic press, depending on protector cap length and diameter. The shell drawn process is followed by internal threading and machining of the inner bevel of the bell formed skirt. These fabrication processes, including production material, and associated tooling and tooling maintenance, are known to be very economical and cost competitive with the high cost of injection molding tooling such as die-casting, but dependent and relative to the quantity of a production run or batch. Furthermore, as thread cutting is commonly performed on semiautomatic lathes or numerical control (NC) automatic lathes and thread grinding machines, as opposed to the use of cutting threads using taps and dies, a production run of for example a three inch diameter protector cap can be divided into an unlimited number of caps having different thread forms and pitches, by a quick change or reforming of a single bit cutting tool, or a change or reforming of a grinding wheel, followed by a change in the tool feed spindle's gear configuration or data input to the NC machine to obtain the desired thread pitch. Thread cutting in the protector cap is normally from a single to three passes cutting process, due to the shallow thread depth and loose machining tolerances required to obtain the desired loose fit with the threaded end on the drill pipe adapter. A change-over to a different thread form or pitch, or both, including proprietary forms and pitches, can normally be executed in a matter of hours. A similar scenario for the protector cap in reference D1, would as a minimum, require retooling between each different thread form, pitch or both by replacing the inner core, representing the internal threads, in the injection die-cast form. The worst case scenario would require an individual injection form for each unknown size, thread form and pitch combination.

The shell drawing process for the protector cap together with the convex, rather than concave, shape and configuration adds considerable strength, rigidity and metal hardness to the protector cap unit. When the cap is installed and torqued and prestressed to the drill pipe's adapter and with established contact between the thread to thread surfaces, and the two parallel surfaces of the lower inner bevel on the cap bell skirt, and the outer bevel on the adapter located between the outside diameter of the adapter and the adapter's hydraulic seal surface, the protector cap provides a complete enclosure of the adapter end, including the critical hydraulic seal surface. The described cap configuration and as installed and secured on the drill pipe's male adapter, provides for a reusable adapter hydraulic seal surface protector, as due to the rigidity of the cap, essential features such as external diameters and bevel seal surfaces, remain unchanged from normal use and exposure, having novel features including a smooth external contour with improved capability to repel an impacting object, specifically objects having sharp edges or pointed features, a one piece component having an outside diameter being the same or less than the outside diameter of the connecting drill pipe adapter diameter, which allow for multiple layer stacking in fabrication shop, warehouse or drill site's storage racks, an improved integrated material strength, hardness and rigidity to resist the most common types of handling impacts from a variety of different directions, and having a radially wide and axially deep annular void which serves as a buffer zone for the cap bell and space for accidental deflection and intrusion of cap bell material and other intruding objects into the vicinity of the adapter seal surfaces, with the main objective of providing optimum protection of the drill pipe adapter's critical hydraulic seal surface. These features are different from the thread protector cap in reference D1 whose primary functions include the strength of collar 38. Protector plugs including collar 38 are typically fabricated for cost and surface 18 which preclude the entry of moisture and other matters into the threaded pin area during extreme thermal cycling, using a unique thread pitch configuration which together with the dimensional differential of the coefficient of thermal expansion of the threaded steel pin and the die-cast zinc protector cap, which creates a tight seal between rod and bevel edge i and cap seal surface 18, with the action of plastically deforming the soft material of surface 18 to the harder material of bevel edge i. This plastic deformation and permanent impregnation of the bevel edge i into surface 18 causes an increase of the material hardness in the deformed area, which will render the protector cap unfit for re-use. The protector cap configuration shown in FIG. 4 with the claimed thread pitch of 10½ threads per inch, the convex, corner and overhang surfaces and together with the features described previously, provide protection for the sucker rod's threads on the end pin, and also limits permanent radial deflection of the end pin from impact forces. It is not obvious that this protector cap configuration is adaptable to the threaded pin and of a drill pipe assembly with its included variety of thread forms and thread pitch including a combination of taper and straight threaded adapter ends, and will provide the desired protection of the drill pipe adapter's hydraulic seal surface.

Another part of the invention relates to a protector end plug designed for the protection of the critical frontal hydraulic seal surface of the side box joint, or drill pipe upset, on a drill pipe assembly, also referred to herein as the drill pipe female adapter. The protector plug has the same characteristics as for the described protector cap for the drill pipe's male adapter, in the specific areas of type and grade of material, thread configurations and included loose fit tolerances, material hardness and thickness and the specified fabrication processes. The protector plug is a shell drawn single component having a lower straight or tapered cylindrical section terminating in a closed end having a center penetration having a non-circular shape for insertion of a torque tool having an equal shape. The upper edge of the cylindrical section has a drawn collar extending outward, from the cylinder's outside diameter, and is also drawn downward into an angular configuration relative to the cylinder's top or horizontal surface. A large radius is incorporated and interfaces the outward and angular drawn collar and the upper end of the drawn cylinder. The diameter of the outer edge of the angular shaped collar is sized to extend, but not beyond, the outside diameter of the drill pipe female adapter. The inner surface and bevel of the angular collar is formed and machined to an angle being parallel to a beveled circumferential surface located between the outer diameter and the frontal hydraulic seal surface on the drill pipe's female adapter. The external surface of the cylindrical shell shaped plug includes loose fitting threads in form and pitch equal to the inside machined threads in a drill pipe's female adapter. When the plug is installed and torqued and prestressed to the drill pipe's adapter end, with established contact between the thread to thread surfaces, and the two parallel surfaces of the inner bevel of the upper shell collar, and the outer bevel on the adapter located between the outside surface of the adapter and the adapter's hydraulic seal surface, the protector plug provides a complete enclosure of the adapter end, including the critical hydraulic seal surface. The described end plug configuration and as installed and secured on the drill pipe's female adapter, provides for a reusable adapter hydraulic seal surface protector, as due to the rigidity of the plug and integrated angular collar, essential features, such as external diameters and bevel surfaces, remain unchanged from normal use and exposure, having novel features including a smooth external contour and low profile with improved capability to repel an impacting object, specifically objects having sharp edges and pointed features, a one piece component having an outside diameter being the same or less than the outside diameter of the connecting drill pipe adapter diameter, which allow for multiple layer stacking in fabrication shop, warehouse or drill site's storage racks, an improved integrated material strength, hardness and rigidity to resist the most common types of handling impacts from a variety of different directions, and having a radially wide and axially deep annular void which serves as a buffer zone of the frontal end of the protector plug, and space for accidental deflection of and intrusion of frontal end plug material and other intruding objects into the vicinity of the adapter seal surface, with the main objective of providing optimum protection of the drill pipe adapter's critical hydraulic seal surface. The thread protector plug in FIG. 6 of reference D2, may not provide the required hydraulic seal surface protection, as described previously, due to, what is believed, an unacceptable configuration including features which may cause detrimental damage to the hydraulic seal surface.

BRIEF DESCRIPTION OF THE DRAWINGS

FIG. 7 is an enlarged view of the protector cap bevel position relative to the outer bevel on the adapter following an impact situation at the end of the protector cap, FIG. 8 is an enlarged view of the condition of the end of the protector cap following an impact situation at the end of the protector cap, FIG. 9 is an enlarged view of the protector cap bevel position relative to the outer bevel on the adapter following an impact situation on the protector cap bell, FIG. 10 is an enlarged view of the protector cap closed end section following the impact situation in FIG. 9

DESCRIPTION OF THE PREFERRED EMBODIMENTS

Figure 1:
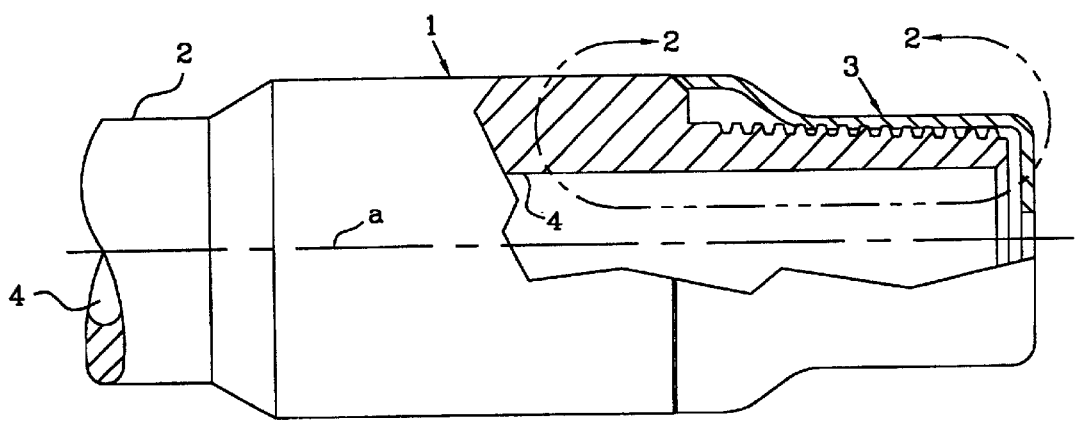
FIG. 1 is a partial sectional and full view of the drill pipe's male adapter, with a protector cap installed.

For the purpose of promoting and understanding of the principles of the present invention, reference will be made to the embodiments illustrated in the drawings, where numerals will indicate the elements of the invention, and description will be used to describe the same. It will nevertheless be understood that no limitation of the scope of the invention is thereby intended.

Figure 11:
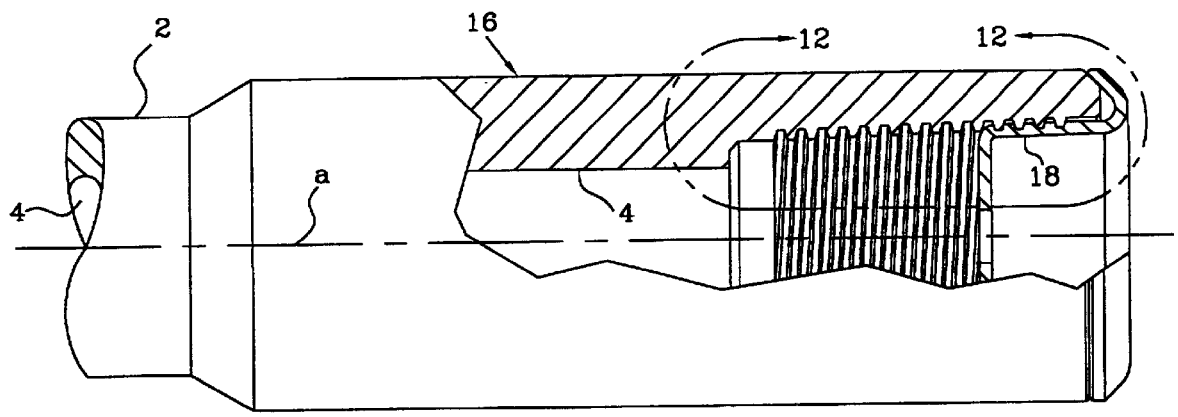
FIG. 11 is a partial sectional and full view of the drill pipe's female adapter, with a protector plug installed.
Figure 19:
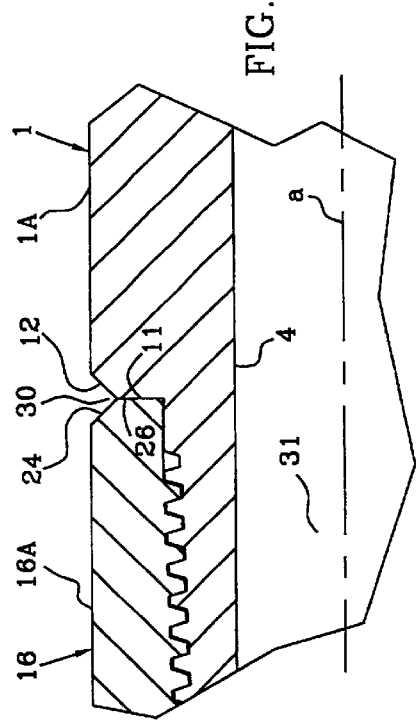
FIG. 19 is an enlarged sectional view of the hydraulic seal surfaces in the mating condition with the male and female adapters screwed together.
Figure 18:
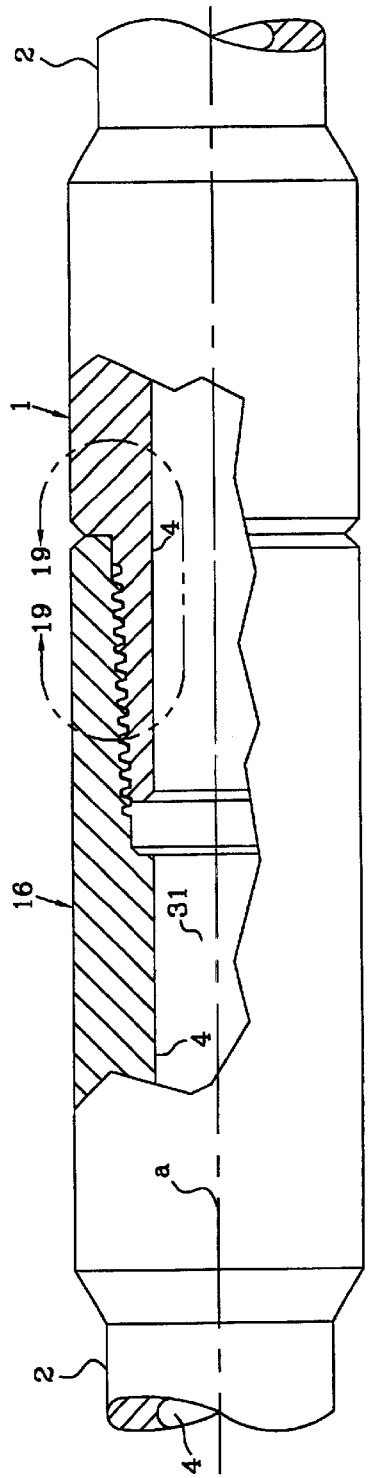
FIG. 18 is a partial sectional and full view of the drill pipe's male and female adapters screwed together in the normal drill operation condition.

A drill pipe's male adapter 1, FIG. 1 and female adapter 16, FIG. 11 is shown with a hydraulic seal surface protector cap 3 and plug 18 installed. The drill pipe adapters 1 and 16 are welded to a drill pipe 2, having a minor diameter. Drill pipe 2 and pipe adapters 1 and 16 are typically fabricated from alloy steel SAE 4137H, equivalent UNS number G41370, having a Rockwell hardness of 30–32 HRC. Drill pipe assemblies diameter vary in sizes from a few inches and up to 18 inches, and can be up to 16 feet long. The most critical surfaces on the assembly are the frontal hydraulic seal surfaces 11, FIG. 5 and 26, FIG. 14. These seal surfaces typically have a surface finish condition or 63 RMS, or better. The two seal surfaces 11 and 26 when joined into configuration 30, FIG. 19 and exposed to a slurry of chemicals, also called mud, pumped through the drill pipe or drill pipe string in area 31, FIG. 18 at a pressure which can go as high as 3,000 PSI, must be able to withstand internal pressures up to this point, combined with high torsional loading and operating vibrations, without leaking.

To assure that the integrity of frontal seal surfaces 11 and 26 are not violated during the final phases of fabrication, storage, transportation and handling at the well site, a variety of different types of protector caps and plugs or clamp-on protectors are installed on the ends of drill pipe adapters 1 and 16. One such type of protector cap for male adapter 1 is cap 3, FIG. 1. A type of protector plug for female adapter 16 is plug 18, FIG. 11. Prior to installing protector caps and plugs or other devices on adapters 1 and 16, external and internal threaded surfaces 5, FIG. 3 and 22, FIG. 13 respectively, including bevel surfaces 12, FIG. 5 and 24, FIG. 14 and frontal seal surfaces 11 and 26, these surfaces are commonly coated with anticorrosive compounds or chemicals. Protector cap 3 and plug 18 are typically fabricated from carbon steel material, but not limited to, gage 12 SAE 1006H, UNS equivalent number G10060, having a Rockwell hardness of 40–45 HRB. Cap 3 and plug 18 are fabricated from this material using press stamping and cold drawn processes, which are known to be very cost competitive processes in terms of set-up time, tool cost and maintenance of same. It is generally known that the cold drawn process adds considerable additional strength, rigidity and material hardness from cold work of the material, especially in angular and radiuses areas. Post drawing processes are followed by machining of protector cap's internal threads 7, FIG. 3 and plug external threads 20, FIG. 13, and protector cap bevel 13, FIG. 6, and as required, plug collar bevel surface 28, FIG. 15. Thread cutting of threads 7 and 20 are commonly performed in semiautomatic or NC automatic lathes or thread cutting machines, with the added advances of having relatively short set-up time between changes of thread form and thread pitches, and between straight or taper threads. Drill pipe adapter threads come in a variety of API designated thread forms and pitches, plus a variety of premium thread forms and pitches, which are industry developed and may be patented proprietary threads. Threads in the stated category are either straight or taper types. Threads 7 and 20 in cap 3 and plug 18, can be, without limitation, machined to any desired form end thread pitch configurations. The threads are typically machined to a loose fit to threads 5 and 22, to prevent thread galling, and to provide for axial thread to thread clearances for reasons stated hereafter.

Figure 2:
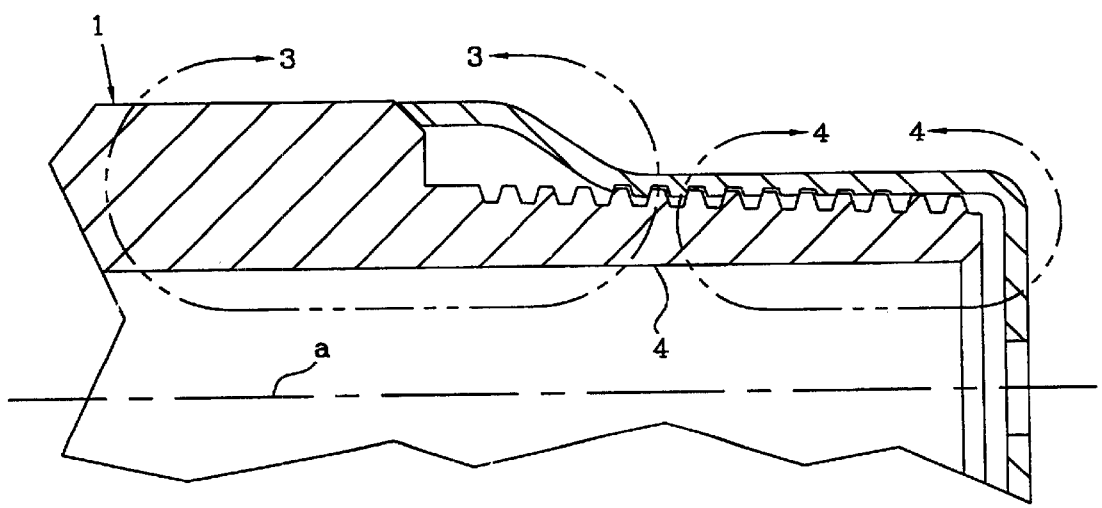
FIG. 2 is an enlarged sectional view of the threaded adapter end and installed bell shaped protector cap.
Figures 3, 4:
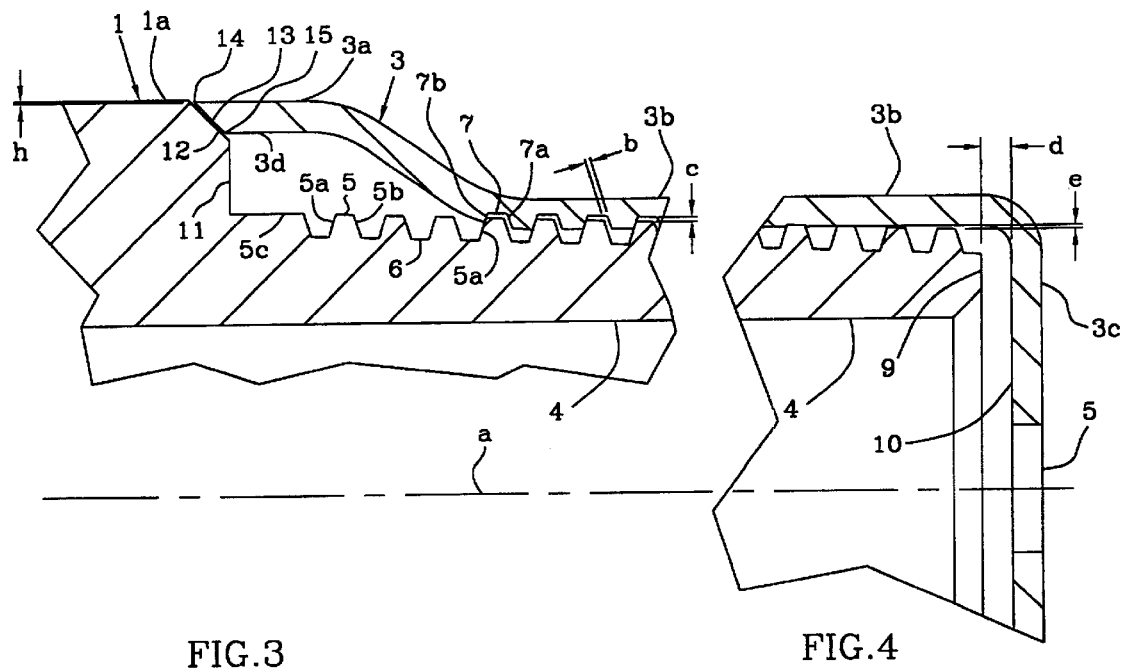
FIG. 3 is a further enlarged sectional view of the protector cap bell.
FIG. 4 is a further enlarged sectional view of the protector cylindrical and closed end section.
Figures 5, 6:
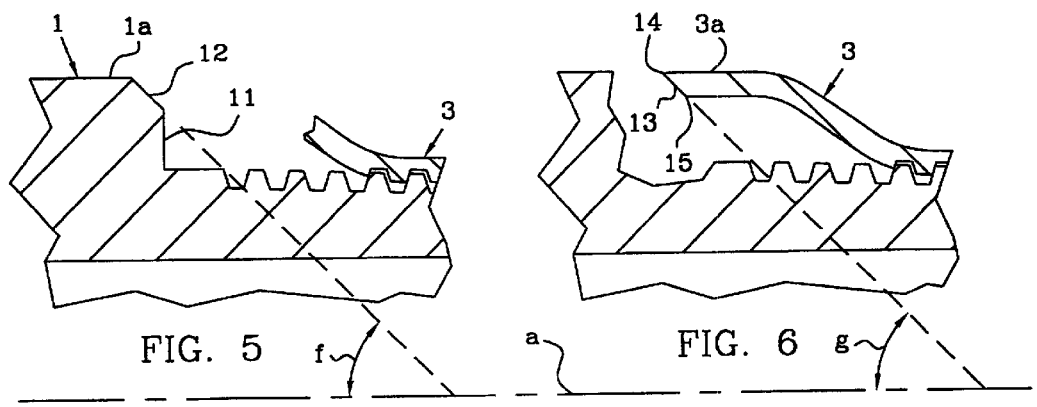
FIG. 5 is an enlarged section view of the adapter end bevel and hydraulic seal surface.
FIG. 6 is an enlarged view of the inner bevel on the protector cap bell edge.

Protector cap 3 for protection of the drill pipe male adapter 1 frontal hydraulic seal surface 11, FIG. 3, is a single piece component screw-on type, having an upper cylindrical section 3b which typically is straight or may be tapered in the axial direction toward the cap's upper closed end 3c. The cylindrical section 3b terminates in an upper closed end 3c having a center penetration 5, FIG. 2 being non-circular in shape for insertion of a torque tool having a similar shape. Cap end 3c penetration 5 may be such dimensioned as to permit the insertion of tooling, with the cap 3 installed on drill pipe adapter 1, required for performing sandblasting and application of epoxy on drill pipe assembly inner surface 4. The cylindrical section 3b also contain internal threads 7. The lower cap section is bell shaped FIGS. 1 and 2, and can be viewed as a skirt 3a extending radially outward from the upper cylindrical section 3b. Bell skirt 3a lower edge 13, FIG. 6 is machined angular to adapter 1 center line a to an angle of approximately 45 degree g. Adapter 1 frontal hydraulic seal surface 11, FIG. 5 extend radially outward from surface 5c to an interfacing edge of angular surface 12, which extend outward to an interfacing adapter 1 outside diameter surface 1a. Surface 12 is angular to center line a by approximately 45 degree f. This angular surface is referred to herein as the adapter 1 outside bevel 12.

When the protector cap 3 is installed on the threaded member of male adapter 1 and being properly torqued, and pre-stressed, torque values vary and are related to the diameter of the cap, contact points are established between angular cap skirt bevel 13, FIG. 3 and adapter 1 outside bevel 12 whose two surfaces are approximately parallel from angles f and g, FIGS. 5 and 6, which establishes a center relationship of surface and inner diameter of 3d, FIG. 3, with center line a, and simultaneous with cap thread surfaces 7b and adapter male thread surface 5a, and which establishes threads major and minor diameter gaps b and c, FIG. 3. Thread to thread clearances are noted at gaps b and c, and between adapter 1 threads minor diameter 6 and cap 3 threads minor diameter 8. Cap 3 upper cylindrical section 3b is in a center relationship with center line a, divided by the narrow gap e, FIG. 4, between the inner surface of 3b and adapter 1 threaded major diameter 5. Impact buffer area or gap d, FIG. 4, is established between threaded adapter end surface 9, and cap 3 closed end 3c inner surface 10. A totally enclosed internal annular protection and buffer zone for hydraulic seal surface 11, is now established between surface 5c and cap skirt 3a inner surface 3d, and in the axial direction from hydraulic seal surface 11 to the last thread engagement between the adapter 1 threaded end, and the internal threads in cap 3.

Figure 12:
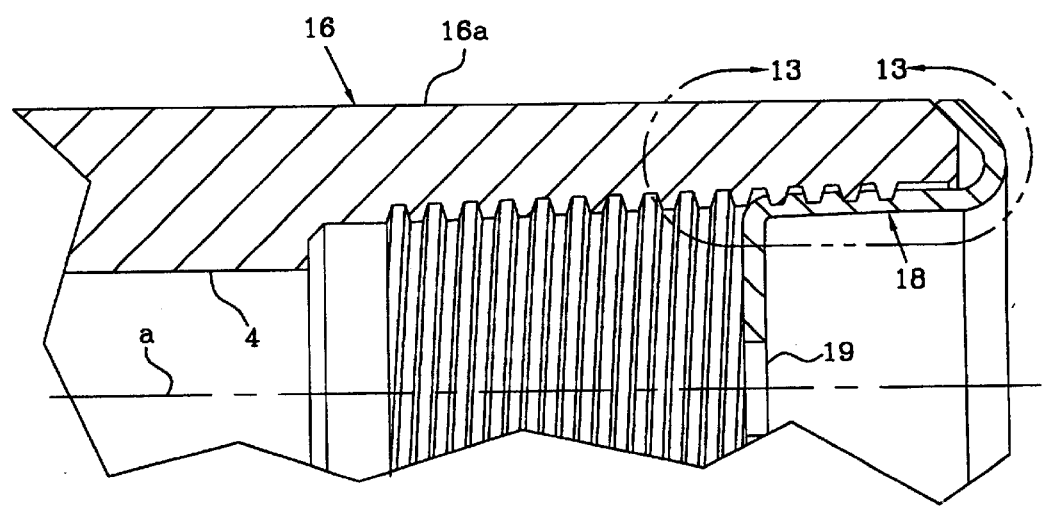
FIG. 12 is an enlarged sectional view of the threaded adapter end and installed shell shaped with integrated angular collar protector plug.
Figure 13:
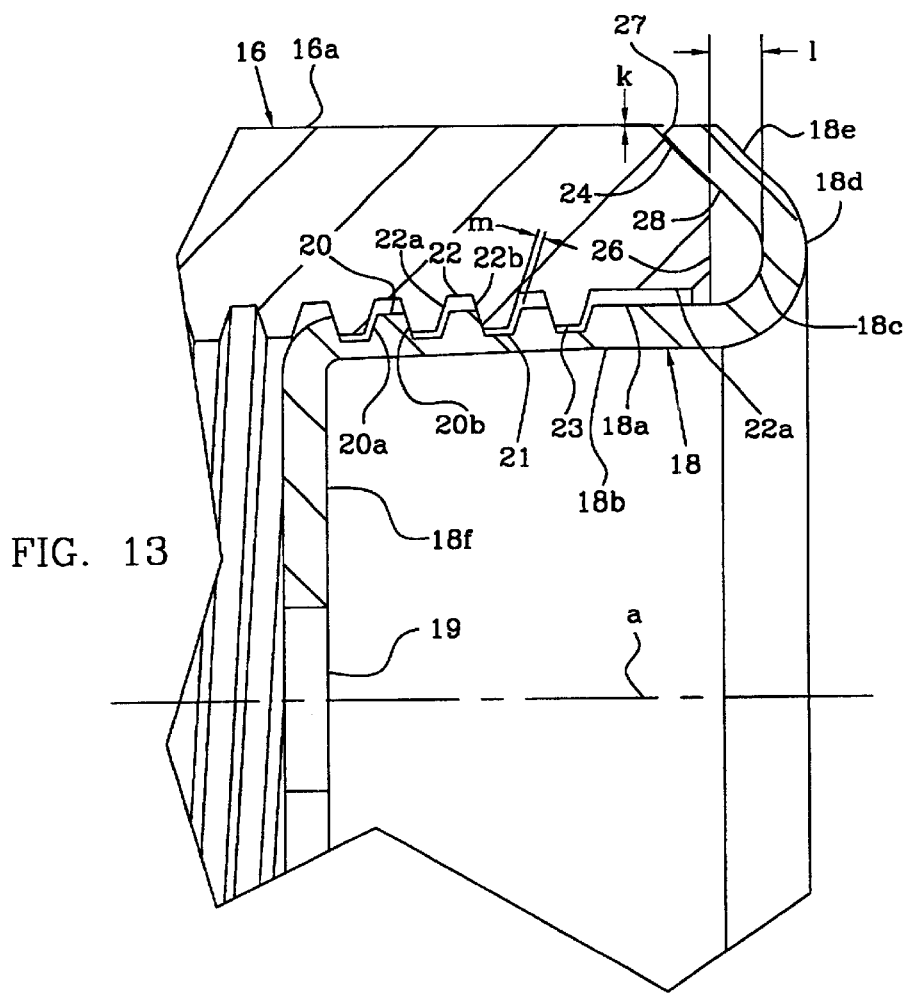
FIG. 13 is a further enlarged sectional view of the threaded adapter end and installed protector plug.
Figures 14, 15:
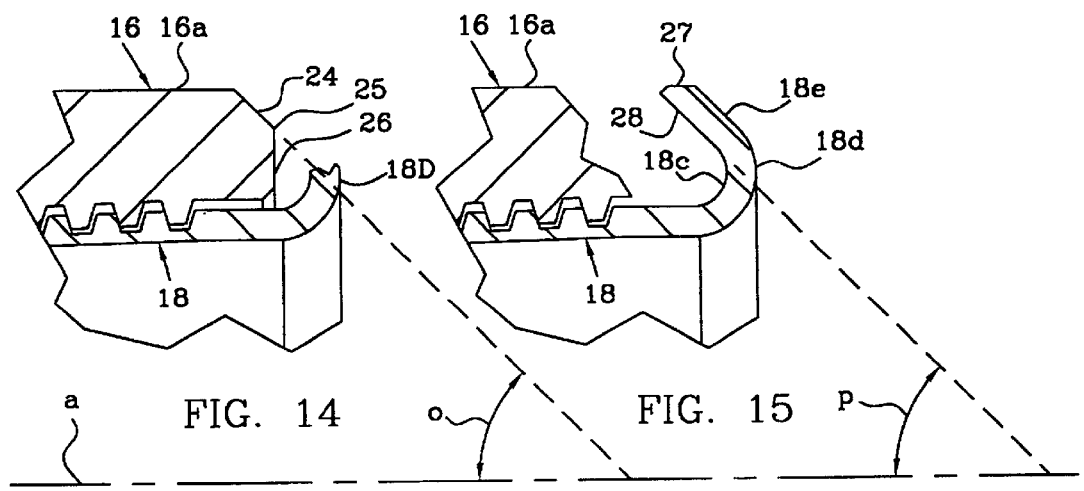
FIG. 14 is an enlarged sectional view of the adapter end bevel and hydraulic seal surface.
FIG. 15 is an enlarged sectional view of the inner collar bevel on the protector plug.

Protector plug 18, FIG. 12 for the protection of the drill pipe female adapter 16 frontal hydraulic seal surface 26, FIG. 14, is a single piece component screw-on type, having a lower section 18b which typically is straight, or may be tapered in the axial direction toward the plug's lower closed end 18f. The closed end 18f has a center penetration 19 being non-circular in shape for insertion of a torque tool having a similar shape. Plug end 18f penetration 19 may be such dimensioned as to permit the insertion of tooling, with plug 18 installed in pipe adapter 16, required for performing sandblasting and application of epoxy on pipe assembly inner surface 4. The lower cylindrical section 18b also contain external threads 20, FIG. 13. The upper edge of the cylindrical section has a drawn collar 18e, FIG. 13 extending outward from the cylinder's outside diameter 18c, and is also drawn downward into an angular configuration relative to the cylinder top or horizontal surface 18d. A large radius 18c is incorporated and interfaces the outward and angular drawn collar 18e, and the upper end 18a of the drawn cylinder. The diameter of the outer edge 27, FIG. 15 of the angular shaped collar 18e is sized to extend, but not beyond, the outside diameter of the drill pipe female adapter. The inner surface 28, FIG. 15 and bevel of the collar is formed and machined angular to adapter center line a to an angle of approximately 45 degree p. Adapter 16 frontal hydraulic seal surface 26 extend radially outward from adapter 16 inner surface 22a, to an interfacing edge 25, FIG. 16 of angular surface 24 which extend outward to interfacing adapter 16 diameter surface 16a. Surface 24 is angular to adapter 16 center line a by approximately 45 degree o. This angular surface 24 is referred to herein as adapter 16 outside bevel surface 24.

When the hydraulic seal protector plug 10 is installed in the internal threads 23 of female adapter 16 and being properly torqued and prestressed, torque values vary and are related to the diameter of the plug, contact points are established between inner angular plug collar surface 28 and adapter 16 outer bevel surface 24, whose two surfaces are approximately parallel from angles o and p, FIGS. 14 and 15, which establishes a center relationship of surface and outer plug cylinder diameter 18a with adapter 16 center line a, and simultaneously with plug thread surfaces 20b and adapter female threads 23, which establishes noted thread clearances m and between plug 18 major thread diameter 20 and adapter 16 minor thread diameter 27 radial gap n between surface 18a and 22a, FIG. 13. Plug 18 radiused surfaces 18c provides for an annular and very rigid impact buffer zone in front of hydraulic seal surface 26. Surfaces 26 and 18c establish buffer zone distance l. Radial diametric differences between plug 18 collar edge 27 and adapter 16 outside diameter 16a, is noted in gap k. A totally enclosed internal annular protection and buffer zone in front of adapter 16 frontal hydraulic seal surface 26 is now established by gap l and radius 18c, and coated angular surfaces 24 and 28, and including the plug 18 to adapter 16 internal threads engagement.

A postulated impact incident in FIGS. 7 and 8, shows impact and direction i, FIG. 8, impacting on protector cap 3 closed end surface 3c. The impact causes deformation of cap 3 closed end 3c, which causes a decrease in gap d between closed and inner surface 10 and adapter 1 end surface 9. Radial gap e between cap inner surface 3d and threaded outside surface 5, remain unaffected. Gap c between cap internal thread major diameter 7 and adapter 1 external thread major diameter 5, remain unaffected. Thread to thread gap b changes to opposite side of thread surfaces FIG. 3, and thread contact changes from 5a against 7b to 5b against 7a, indicating that cap 3 moved in the direction toward the hydraulic seal surface 11 at a distance equal to the radial thread to thread clearances b, and with cap 3 angular bell edge 13 in contact with angular adapter bevel 12, the impact loading allow for radial and circumferential cap bell skirt 3a expansion caused by the linear loading between the two angular surfaces 12 and 13. This radial expansion is seen in overhang value h between external surfaces 1a and 14. Overhang h may decrease to a less or the original value upon the termination of the impact force. This expanding and retracting action and consequent change in value h, may be seen as a spring and impact absorbing force with the limiting factor being the amount of thread to thread clearance in unspecified value b, where part of final and peak of impact force is absorbed between thread point contact surfaces 5b and 7a. This is normally not seen as a concern, due to the differential in hardness of the drill pipe adapter's alloy steel threads 5, and the softer material thread surfaces of protector cap threads 7. During and after this demonstrated event of induced impact forces to the end surface 3c of protector cap 3, the critical hydraulic seal surface 11, remain unaffected.

A similar event is illustrated in FIGS. 9 and 10, with the exceptions that the impact force is from direction j going toward protector cap bell surface 3a, causing what may be seen as a permanent deformation of surface 3a and an increase in overhang value h and a reconfiguration in the angular and parallel relationship between surfaces 12 and 13, and where cap bell edge 15 is now in contact with surface 12. All other features such as gaps b, c, d and e remain unchanged, including the thread to thread contact points 5a to 7b. The hydraulic seal surface 11 remain unaffected protected during this event.

Figure 16:
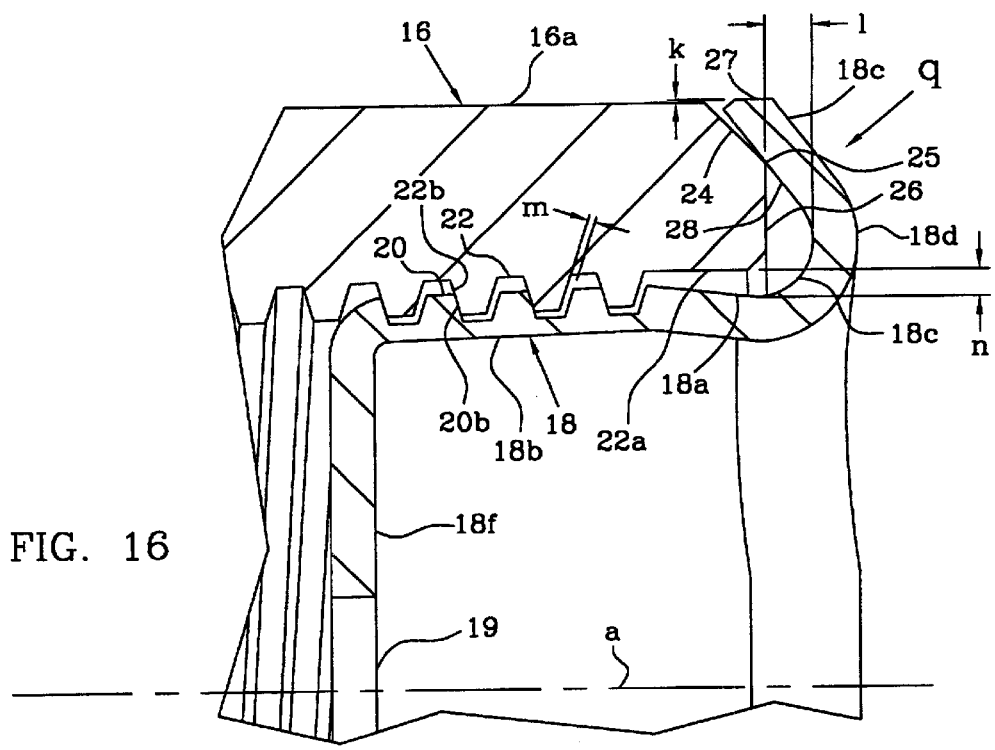
FIG. 16 is an enlarged sectional view of the protector plug collar following an impact situation from an off center direction.

In yet another event of incidental impact induced forces to the drill pipe assembly, in FIG. 16, drill pipe female adapter 16, installed hydraulic seal surface protector plug 18 is affected by a local impact from direction a going angular toward plug collar radius 18d and angular surface 18c, which consequently relocates a portion of the plug 18 collar inward toward the pipe assembly center line a. The impact reconfigure the angular seating relationship between adapter 16 outside bevel surface 24, and protector cap inner collar surface 28. Surface 28 is now seated on surfaces 26 and 24 interconnecting edge 25, with a consequent increase in gaps l and n. No change to thread to thread clearance m is obsious, and thread to thread contact is maintained a surfaces 20b and 22b. An increase in gap k between adapter diameter 16a and protector cap collar edge diameter 27, is anticipated. Raised metal into seal surface 26 from the sliding movement of surface 28 against edge 25, is not anticipated due to the differential and hardness between the adapter 16 alloy steel and the softer carbon steel of the protector cap 18. During this impact event, the drill pipe adapter's hydraulic seal surface, remained unaffected and protected.

Figure 17:
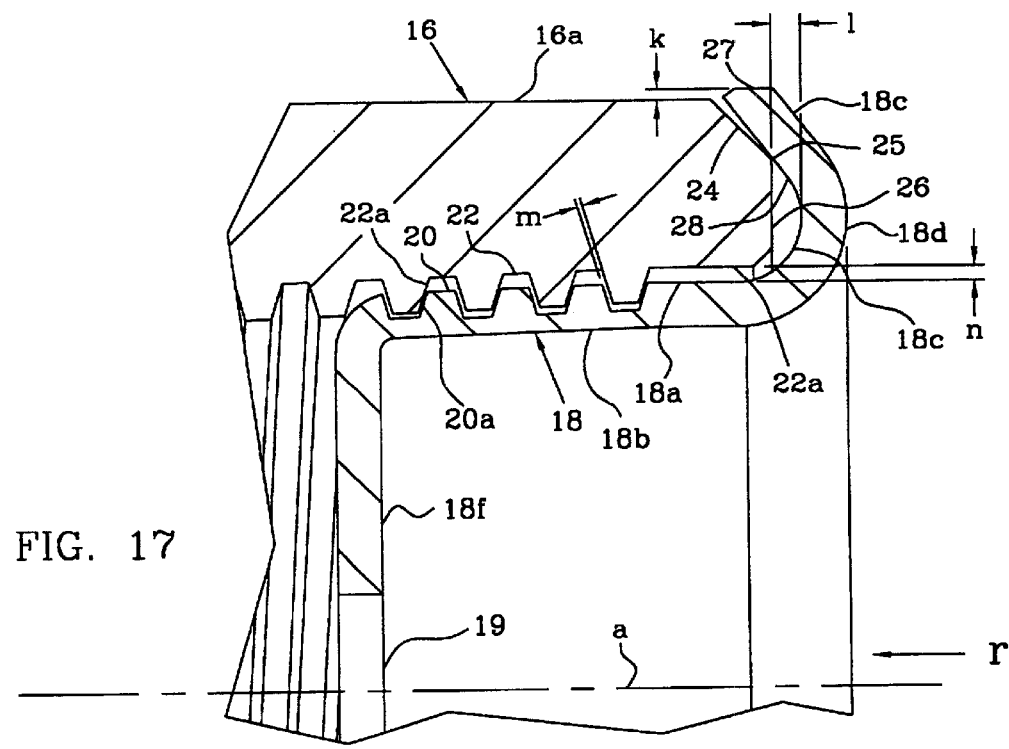
FIG. 17 is an enlarged sectional view of the protector plug collar following a center on impact situation.

In the last event to be illustrated, in FIG. 17 the protector plug is impacted by a center-on frontal impact, from direction r. As noted in FIG. 17, the plug 18 is relocated toward the frontal end and seal surface 26 of adapter 16. Angular collar surface 28 flares out and looses its parallel relationship with adapter 16 outside angular bevel surface 24, while surface 24 is now in contact with surfaces 26 and 24 interfacing edge 25. The impacting linear force on the two mating angular surfaces causes an increase in collar angle p, FIG. 15, and an increase in collar edge diameter 27, which causes an increase in cap bevel overhang k being the difference between diameters 27 and 16a, thus causing a decrease in buffer space l but no notable changes in radial gap n between inner adapter surface 22a, and outer plug cylinder surface 18a. Thread to thread gap m changes to opposite side of thread surfaces FIG. 13, and thread contact changes from 20a against 22b to 20a against 22a, indicating that plug 18 moved in the direction toward the hydraulic seal surface 26 at a distance equal to the radial thread to thread clearances m, and with plug 18 angular edge 28 in contact with angular adapter bevel 24, the impact loading allow for radial and circumferential plug collar 18c expansion caused by the linear loading between the two angular surfaces 24 and 28. Overhang k may decrease to a less or the original value upon the termination of the impact force. This expanding and retracting action and consequent change in value m, may be seen as a spring and impact absorbing force with the limiting factor being the amount of thread to thread clearance in unspecified value m where part of final and peak of impact force is absorbed between thread point contact surfaces 20b and 22b. This is normally not seen as a concern, due to the differential in hardness of the drill pipe adapter's alloy steel threads 22 and the softer machined thread surfaces of protector plug threads 20. During and after this demonstrated event of included impact forces to the end surface 18d of protector plug 18, the critical hydraulic seal surface 24, remain unaffected.

Industrial application of the invention

The disclosed invention consisting of hydraulic seal surface protector caps connected to external threaded members and protector plugs threaded into internal threaded components, can be used in tools, components and pipe assemblies having frontal seat and seal surfaces, and having threaded connections per normal standards, or special premium proprietary threads. Reference D1 refer to a sucker rod (FIG. 1, d) having a thread protector cap (10) installed to protect the threaded pin ends of rod (d). In cap (10, FIG. 4) surface (18) seal on interfacing edge (i) which is the circumferential line point between surfaces (b) and (g). Surface (b) is not a hydraulic seal surface. Surfaces (b) or (g) are the contact surfaces for a connecting female threaded coupling, which is used to connect the next sucker rod in the string, which may seat when installed, on either surface (d) or (g). The intended sealing action between point (j) and cap surface (18) is dependent on the angular relationship between surface angles (h) and (e) which must be non-parallel, with angle (h) being 60 degrees relative rod center line (f), and angle line (e) being 45 degree relative to rod center line (f). Rod end shoulder (b) is perpendicular to rod center line (f).

What is claimed is:

1. A screw-on seal protector cap (3) to protect the critical frontal hydraulic seal surface (11) of the side pinion joint (1) on a drill pipe assembly, by sizing the bell formed protector diameter (3a) so that it has a diameter equal, but not greater, to the outside diameter of the drill pipe adapter's joint diameter (1a), with the lower edge (14) of the bell (3a) having an inside bevel (13) of approximately 45 degrees (g) relative to the axial center line (a) of the protector cap (3) and being parallel to, the angle (f) of the bevel (12) of the adapter joint (1) that the bell bevel seats on, this bell shaped protector cap (3) having internal contoured threads (7) in a form and pitch equal to the external threads (5) at the end of the pipe adapter having sufficient end play (b) when assembled together to prevent seizure, and with an upper closed end (3c) having provision (5) for accepting a torque tool device used to lighten and prestressing the axial length of the bell shaped protector cap (3) between the threaded engagement (5, 7) of the cap (3) and the drill pipe adapter (1) and the inner bevel (13) on the bell (3a) being in contact with the outer bevel (12) adjacent to the critical planar circumferential hydraulic seal surface (11) on the drill pipe adapter (1) which is perpendicular to the center line axis (a) of the drill pipe adapter (1).

2. A screw-on seal protector cap (3) as claimed in claim 1 which is characterized by having an inner bevel surface (13) being in contact with a mating beveled surface (12) on the drill pipe adapter's outer diameter (1a) corner, which when being torqued and pre-stressed the axial loading deflects, relative to the applied torque, the beveled edge (13) outward (h) in the circumferential direction and away from the critical hydraulic seal surface (11) at the load points (12, 13) between the two mating bevels, thus inducing a static spring force condition which will preclude premature loosening and potential loss of the seal protector cap during thermal cycling and handling and transportation of the drill pipe assembly.

3. A screw-on seal protector cap (3) as claimed in claim 1 which is characterized by that the axial spacing between the end (9) of the threaded portion (5) of the drill pipe adapter (1) and the inner top surface (10) of the seal protector cap function as an impact buffer (d) to protect the rod end (9) when exposed to axial loading (i) or impact during handling, and having a feature incorporated into the cap (3) design to minimize detrimental deformation of the end of the cap (3c, 10) and internal buffer area (d) as axial loading and impact is transferred along the axial direction through the cylindrical body of the cap which may move the cap a distance equal to the thread to thread clearance (b) and where the induced force is absorbed at the lower inner bevel joint (13) which will expand circumferentially and in the radial direction (h).

4. A screw-on seal protector cap (3) as claimed in claim 1 which is characterized by that the inner bevel surface (13) on the protector cap bell (3a) is in its prestressed condition seated on the external mating bevel (12) of the drill pipe adapter and not on the critical hydraulic seal surface (11) which is adequately protected in the event of radial loading (j) and impact on the bell formed section (3a) of the protector cap (3) and in the vicinity of the bevel to bevel contact area (12, 13), having sufficient strength to prevent the bell bevel to invade into the critical hydraulic seal surface (11) by limiting local deformation and radial shift (h) of the bell bevel (13) during radial loading and impact conditions.

5. A screw-on seal protector cap (3) as claimed in claim 1 which is characterized by that when the cap is provided with a large opening (5) in the upper closed end (3c) of the cap it will have the capability, when properly screwed on the end of a drill pipe adapter (FIG. 1), to provide for access into the pipe interior (31, FIG. 18) for the purpose of sand blasting and applying epoxy paint to the interior wall (4) of the drill pipe (2) and attached adapters (1, 16) and oven heat curing of the applied epoxy, while the critical external adapter end surfaces (11, 26) are protected.

6. A screw-on seal protector plug (18) to protect the critical frontal hydraulic seal surface (26) of the box side joint (16) on a drill pipe assembly, by sizing the edge (27) or the rolled over collar (18e) in such a manner that the collar edge (27) exceeds the minor diameter (25) of the adapter joint bevel (24), the rolled over plug collar edge (18c) having an inside bevel (28) of approximately 45 degree (p) relative to the axial center line (a) of the protector plug (18) or profile equal to and parallel with the angle (o) of the adapter (16) joint bevel (24) that the plug (18) collar (18e) bevel (24) seats on, this plug and collar shaped protector (18) having external contoured threads (20) in a form and pitch equal to the internal threads (22) on the pipe adapter box joint (16) and having sufficient end play (m) when assembled together to prevent seizure, and with a lower closed end (18f) having provision (19) for accepting a torque tool device used to tighten and prestressing the axial length of the plug (18) and collar (18e) between the threaded engagement (20, 22) of the plug (18) and the drill pipe adapter (16) and the inner bevel (28) of the collar (18e) being in contact with the outer bevel (24) adjacent to the critical planar circumferential hydraulic seal surface (26) on the drill pipe adapter (16), which is perpendicular to the center line axis (a) of the drill pipe adapter (16).

7. A screw-on seal protector plug (18) as claimed in claim 6 which is characterized by having an inner collar bevel surface (28) being in contact with a mating beveled surface (24) on the drill pipe adapter's outer diameter (16a) corner (24), which when being torqued and prestressed the axial loading deflects, relative to the applied torque, the beveled edge (27) in the outward and circumferential direction (k) and away from the critical hydraulic seal surface (28) at the load points between the two mating bevels (26, 28), thus inducing a static spring force condition which will preclude premature loosening and potential loss of the seal protector plug during thermal cycling and handling of the drill pipe assembly.

8. A screw-on seal protector plug (18) as claimed in claim 6 which is characterized by having an incorporated radium (18c) shaped horizontal surface (18d) of the plug's rolled over collar (18e) as opposed to a flat horizontal surface, being such shaped having greatly improved strength and creating an inner void (i) and axial spacing (i) between the inner surface (18c) of the plug collar (18e) and the critical hydraulic seal surface (26) at the end (26) of the drill pipe adapter (16) which will function as an impact buffer to protect the horizontal hydraulic seal surface (26) from axial and radial loading and impact, as loading and impact force may move the plug body in the axial direction (r) by a distance equal to the thread to thread clearance (m) and where the induced force is absorbed by the two beveled joints (24, 28) between the plug collar (18e) and the drill pipe adapter (16), where the bevel (28) on the plug collar edge (18e) will deflect in the radial and circumferential directions (k) and away from the critical hydraulic seal surface (26).

9. A screw-on seal protector plug (18) as claimed in claim 6 is characterized by that when the protector plug (18) is provided with a large opening (19) in the lower closed end (18f) of the plug (18) having the capability to, when properly screwed on to the end of the drill pipe adapter (16), provides for access into the pipe interior (31, FIG. 18), for the purpose of sand blasting and applying epoxy to the interior wall (4) of the drill pipe and the attached adaptors (1, 16) while the critical external adapter end surfaces (11, 26) are protected.

\* \* \* \* \*

UNITED STATES PATENT AND TRADEMARK OFFICE
CERTIFICATE OF CORRECTION

PATENT NO.    : 6,474,411 B1
DATED         : November 5, 2002
INVENTOR(S)   : Angel Gabriel Amadeo Carrano Castro It is certified that error appears in the above-identified patent and that said Letters Patent is hereby corrected as shown below:

<u>Title page,</u>
Insert -- [30] Foreign Application Priority Data Dec. 11, 1998 (MX) 98357 --.

Signed and Sealed this

Eleventh Day of March, 2003

JAMES E. ROGAN
*Director of the United States Patent and Trademark Office*